April 21, 1959
G. E. HENNING
2,882,555
PLASTICS EXTRUDING APPARATUS
Filed April 6, 1955
2 Sheets-Sheet 1
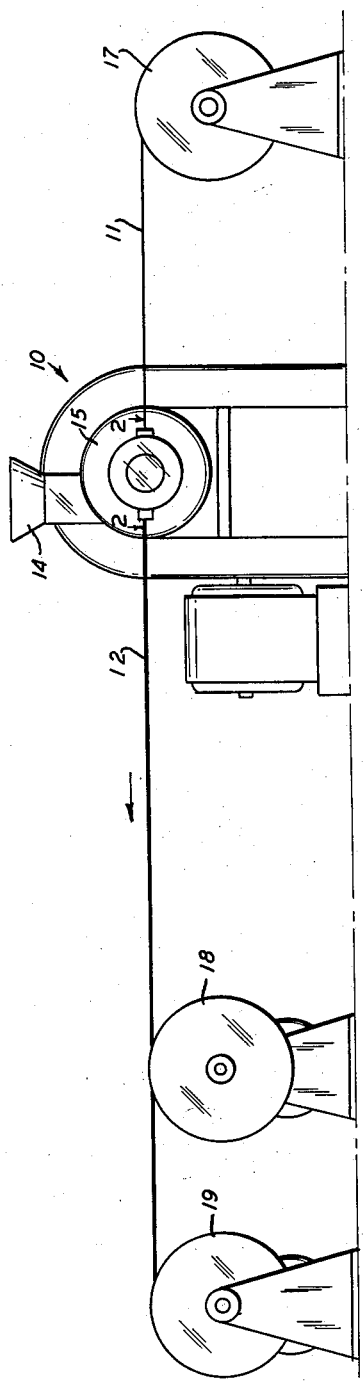
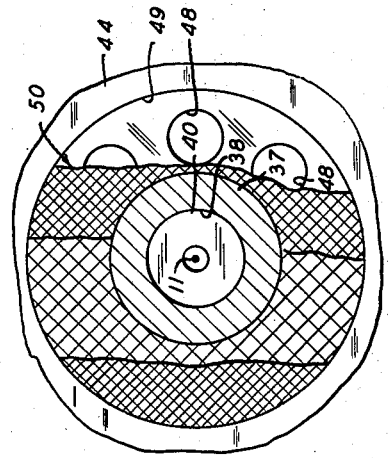
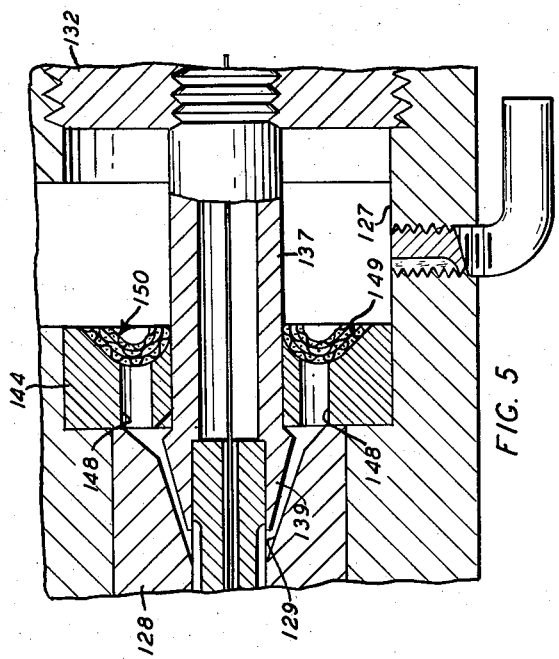
INVENTOR.
G. E. HENNING
BY
ATTORNEY INVENTOR.
G. E. HENNING
BY *[signature]*
ATTORNEY

United States Patent Office

2,882,555
Patented Apr. 21, 1959

2,882,555

PLASTICS EXTRUDING APPARATUS

George E. Henning, Baltimore, Md., assignor to Western Electric Company, Incorporated, New York, N.Y., a corporation of New York Application April 6, 1955, Serial No. 499,550

4 Claims. (Cl. 18—13)

This invention relates to plastics extruding apparatus, and more particularly to apparatus for extruding expanded plastic insulation upon cores, such as elongated electrical conductors or the like.

In the manufacture of certain types of conductors for use in communication devices, an insulated covering is extruded around the conductor. Solid or granular plastic material, for example, polyethylene, is fed into an extrusion machine to perform this covering operation. The polyethylene may have an expanding agent therein which decomposes to produce gas to form a cellular insulating covering around the conductor. The plastic material is fed into an extrusion cylinder, advanced and worked therein by an impelling means, such as a stock screw, and fed into an extruding head where it is formed into a covering around the conductor. In the past it has been the practice to place a screen pack between the extrusion cylinder and the extruding head to strain any foreign matter or lumps from the plastic material before it is applied to the conductor. These packs, after accumulating a certain amount of foreign matter, must be removed for cleaning or replacing at frequent intervals. To accomplish this removal, it has been necessary to detach the whole extruding head from the extruding machine in order to obtain access to the screen pack. This has been a long and tedious operation with the result that a machine is out of operation for an unduly long length of time while the screen packs thereof are being replaced.

An object, therefore, of the invention is to provide new and improved plastics extruding apparatus.

Another object of the invention is to provide new and improved apparatus for extruding expanded plastic insulation upon cores, such as elongated electrical conductors or the like.

A further object of the invention is to provide an extruding head from which screens for straining the plastic material may be quickly removed for cleaning or replacing.

A plastics extruding apparatus, embodying certain features of the invention, may include an extruding head having a passage therethrough, a die secured within the passage, a core guide mounted longitudinally of the passage and designed to cooperate with the die to control the amount of extruded plastic flowing therebetween, and annular screening means surrounding the core guide to prevent the passage to the die of foreign matter and oversized particles in the plastic.

Other objects and advantages of the invention will appear from the following detailed description of apparatus forming specific embodiments thereof, when read in conjunction with the appended drawings, in which:

Fig. 1 is a side elevation of apparatus forming one embodiment of the invention;

Fig. 3 is an enlarged, fragmentary section taken along line 3—3 of Fig. 2, with parts broken away to illustrate the construction of certain elements;

Fig. 5 is a fragmentary section illustrating an alternative embodiment of the invention.

Figure 2:
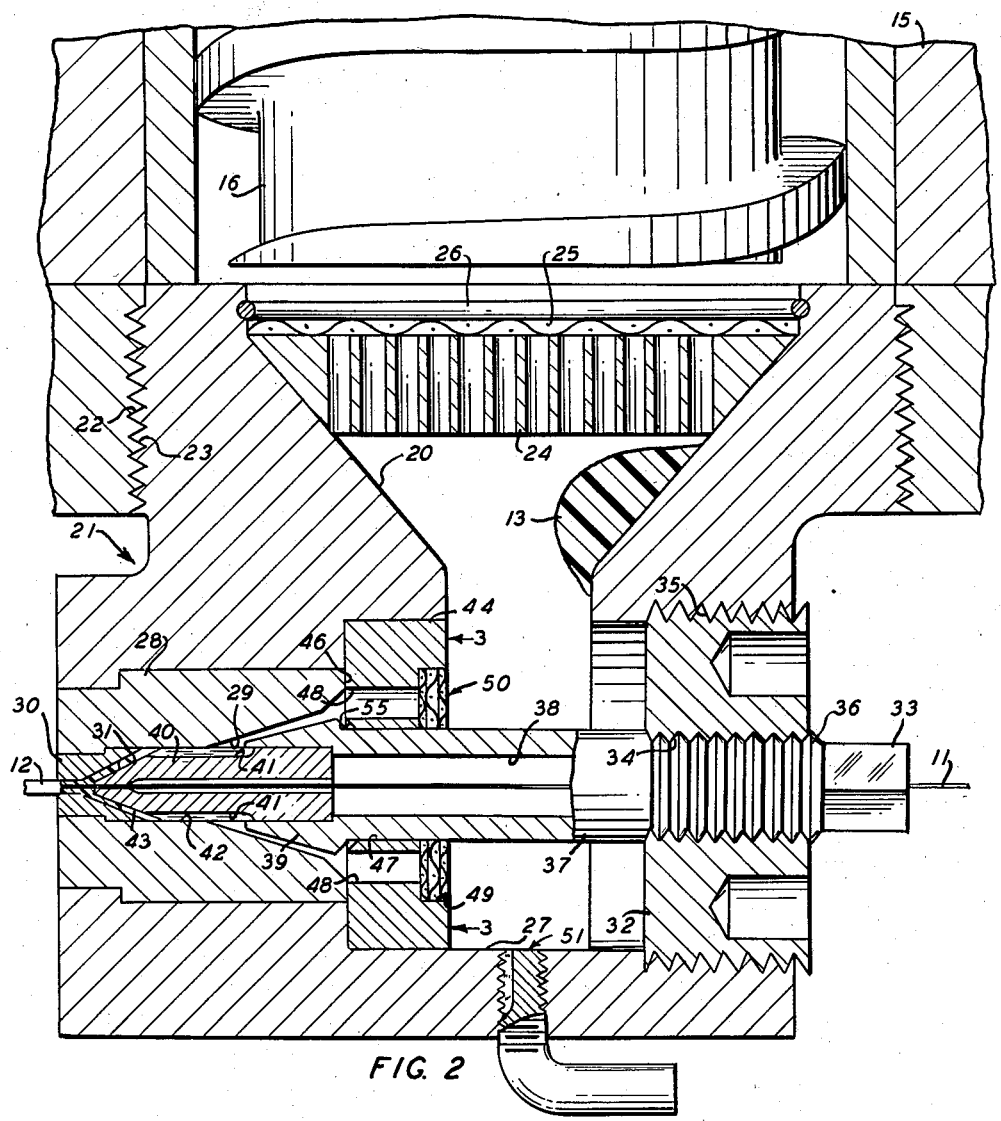
Fig. 2 is an enlarged, fragmentary section taken along line 2—2 of Fig. 1.
Figure 4:
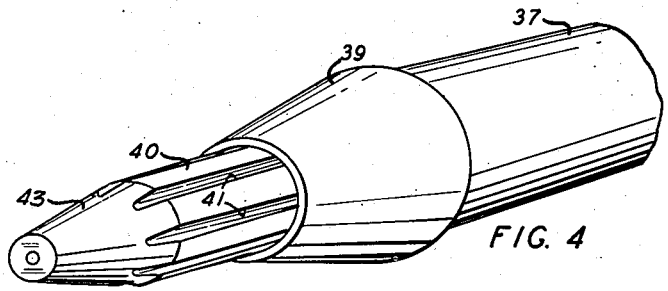
Fig. 4 is an enlarged, fragmentary, perspective view of a portion of the structure shown in Figs. 2 and 3.

Referring now in detail to the drawings and more particularly to Figs. 1 and 2, an extruding machine, designated generally at 10, is provided to extrude plastic material onto a conductor 11 to form an insulated covering 12 therearound. A suitable plastic material 13 is placed in a hopper 14 and from there it flows to an extrusion cylinder 15. A motor-driven stock screw 16 (Fig. 2) is positioned within the extrusion cylinder 15. The stock screw 16 works the material 13 and impels it along the cylinder 15.

The conductor 11 advances to the extruding machine 10 from a supply stand 17 and is pulled therethrough by a capstan 18. The insulated conductor passes around the capstan 18 and finally is wound on a takeup reel 19.

Referring to Fig. 2, the plastic material 13 is forced by the stock screw 16 along the extrusion cylinder 15 and into a tapered passageway 20 formed within an extruding head, designated generally at 21, which has an externally threaded portion 22 engaging a corresponding internally threaded portion 23 within the extrusion cylinder 15. Between the extrusion cylinder 15 and the extruding head 21 is a breaker plate 24 which supports a screen pack 25. The screen pack 25 is secured in its position adjacent to the breaker plate 24 by a snap ring 26. This position for the screen pack 25 within the extruding head 21 is the conventional one for such packs. Usually, the screen pack 25 comprises a plurality of various-mesh screens including screens of both coarse and fine mesh. For the purposes of the present invention, a comparatively coarse screen only is secured in this position in order to prevent large particles of foreign matter from passing therethrough. As a result, the screen shown at 25 will have to be removed for cleaning or replacing only at infrequent intervals. As an illustrative example, when polyethylene having an expanding agent therein is to be extruded, the screen 25 may be a coarse screen in the order of 14-mesh screen, or a plurality of screens of approximately this size may be used.

The plastic material 13 is forced by the stock screw 16 through the tapered passageway 20 and from there into an extrusion passage 27 formed in the extruding head 21 at right angles to the axis of the extrusion cylinder 15. This transverse-head type of extruder has certain advantages in the art, such as the obvious one of extruding materials onto moving conductors without complicating the operation of the material feeding means.

Positioned within the extrusion passage 27 is a die holder 28 provided with a frustoconical bore 29 formed at a predetermined angle with respect to the longitudinal axis of the die holder. A forming die 30 is inserted within the die holder 28, and the die also is provided with a frustoconical bore 31.

Into the entrance end of the passage 27, that is, at the end into which the conductor 11 enters, a lock nut 32 is secured within a threaded portion 35 thereof. A threaded aperture 34 is formed within the lock nut 32 to receive a threaded portion 36 of a core tube holder 37 having a central bore 38 therethrough. The core tube holder 37 is provided at its inner end with a frustoconical plug 39 which matches the frustoconical bore 29 in the die holder 28 to form a valving mechanism for controlling the properties of the extruded product. To vary the setting of the valve formed by the plug 39 and the bore 29, a shank 33 is provided at the outer end of the core tube holder 37, by which the core tube holder can be rotated. Due to the coaction of the threaded portion 36 of the core tube holder 37 with the threaded aperture 34 in the lock nut 32, the position of the plug 39 with respect to the bore 29 can be adjusted by turning the shank 33.

Secured within the central bore 38 of the core tube holder 37 is a core tube 40 having along the periphery thereof, a series of grooves 41—41 which are parallel to the longitudinal axis of the core tube. With the core tube secured within the die holder 28, as shown in Fig. 2, the material to be extruded is forced through the apertures formed by the grooves 41—41 and a straight central bore 42 of the die holder 28. The advantage of this structure is that equal amounts of plastic material are presented to the conductor 11, so that the material 13 extruded thereon is distributed uniformly around the periphery thereof.

The core tube 40 also has a frustoconical forward end 43 designed to match the frustoconical bore 31 in the die 30. The position of the end 43 of the core tube 40 with respect to the bore 31 in the die 30 is varied when the position of the plug 39 on the core tube holder 37 is changed with respect to the bore 29 of the die holder 28. Thus, the end 43 of the core tube 40 abuts the bore 31 of the die 30 when the plug 39 abuts the bore 29.

Positioned within the passage 27 is an annular breaker plate 44 which abuts the end 46 of the die holder 28. The breaker plate 44 has a central aperture 47 therethrough which permits a sliding fit with the core tube holder 37. The breaker plate 44 has a plurality of apertures 48—48 therein, through which passes the plastic material 13 advancing from the tapered passageway 20 to the die 30. An annular groove 49 is formed in the breaker plate 44, and an annular screen pack 50 is mounted within the groove 49. The screen pack 50 comprises a plurality of various fine-mesh screens which stop the passage of substantially all foreign matter that may be passed by the screen 25 or other foreign matter formed due to the decomposition of the expanding agent in the polyethylene after it passes the screen 25. When expanded polyethylene is being extruded, the screen pack 50 may include three fine-mesh screens with the outer two of 40-mesh size and the center screen of 60-mesh size.

The extruding head 21 is assembled on the extruding cylinder 15 by coupling the threaded portion 22 of the head 21 to the corresponding threaded portion 23 of the cylinder 15, and the various members can then be placed within the passage 27. The die holder 28 is first placed within the passage 27 in the position shown in Fig. 2, by passing it from right to left through the entrance end of the extruding head 21. The die 30 is then placed within the die holder 28 in a similar fashion. The breaker plate 44, with the plurality of various fine-mesh screens which comprise the screen pack 50 fitted within the groove 49, is then inserted over the core tube holder 37 from the rearward end thereof to a position adjacent to the frustoconical plug 39. The core tube 40 is secured to the forward end 39 of the core tube holder 37.

The conductor 11 is then threaded through the center of the core tube holder from the rearward end thereof, and through the centers of the core tube 40 and die 30. The conductor 11 then is wound around the capstan 18, and the end thereof is connected to the takeup reel 19. The entire assembly, including the core tube holder 37, the core tube 40, the breaker plate 44 and the screen pack 50 is inserted within the passage 27 from the entrance end of the head 21 to substantially the position shown in Fig. 2. Finally, the threaded aperture 34 of the lock nut 32 is coupled onto the threaded portion 36 of the core tube holder 37 and within the threaded portion 35 of the passage 27.

The rate that the plastic material 13 flows from the cylinder 15 through the passage 27 and into the die 30 is controlled by the setting of the core tube holder 37 as hereinbefore described. If desired, the plastic material can be completely cut off from the die 30 by turning the shank 33 on the core tube holder 37 so that the threads 36 thereon advance it to the point where the frustoconical plug 39 seats within the frustoconical bore 29 of the die holder 28. At this time the frustoconical forward end 43 of the core tube 40 also seats within the frustoconical bore 31 of the die 30 and the flow of plastic material 13 is completely cut off. When this is done a relief valve 51 may be opened to provide an exit for the plastic material.

Ordinarily, however, the valving mechanism is set substantially as shown in Fig. 2, and the plastic material follows a path from the cylinder 15 where it is impelled and worked by the stock screw 16, through the passageway 20, into the passage 27, through those portions of the screen pack 50 that are in line with the apertures 48 of the breaker plate 44, through the apertures 48, through the area between the plug 39 and the bore 29, through the grooves 41—41, through the area between the forward end 43 of the core tube 40 and the bore 31 and onto the conductor 11 within the die 30.

With the apparatus positioned as shown in Fig. 2, and with the conductor 11 being passed through the extruding head 21, foreign matter in the plastic material is stopped by and accumulates on the screen pack 50. No special means is required to retain the screen pack 50 within the groove 49 of the breaker plate 44. After the extruding operation has begun, the pressure exerted on the screen pack 50 by the plastic material will be sufficient to hold the pack 50 securely in place.

Since the screen pack 50 includes screens of fine-mesh, it must be removed for cleaning or replacing more often than is the case with the coarse screen 25. The removal of the screen pack 50 is a simple matter compared to the removal of the conventional screen pack of the type shown at 25. To remove the fine-mesh screens in the pack 50, it is merely necessary to unscrew the lock nut 32, and to withdraw the core tube holder 37 from the passage 27. The frustoconical plug 39 abuts a relieved portion 55 of the breaker plate 44 so that the breaker plate 44, and consequently the screen pack 50, can be easily withdrawn from the passage 27 with the core tube holder 37. Therefore, a new screen pack 50 can be replaced in a faster time than would be required to replace a screen such as the screen 25, the removal of which would require dismantling the whole extruding head 21. The screen 25 may be of such a large size that it need be changed only during a time that the extruder is normally not in operation.

When it is desired to remove the screen pack 25 for cleaning or replacing, the apparatus shown in Fig. 2 is more convenient that that of the conventional extruder. In conventional designs of extruders, the end of the extrusion cylinder and the extending head are provided with machined flanges, which were bolted together to form a pressure-tight joint so that all of the material being extruded would be advanced through the extruding head. In the present invention, because of the cooperation between the threaded portion 22 on the extruding head 21 and the corresponding threads 23 within the extrusion cylinder 15, it is necessary only to unscrew the extruding head from the extrusion cylinder and remove the snap ring 26 in order to gain access to the screen pack 25. This structure is also convenient since no difficulties in aligning the extruding head 21 with the extrusion cylinder 15 are encountered.

Another advantage of the invention is that, if necessary, the conductor 11 may remain in the passage 27 while the screen pack 50 is being removed for cleaning or replacing. After the passage of the conductor 11 has been stopped and the lock nut 32 and core tube holder 37 withdrawn, the screen pack 50 may be severed, preferably along a radius thereof, and completely removed. When it is desired to replace the screen pack 50 with a new pack, the new one need only be severed in a similar manner, opened slightly at the severed portion and placed around the conductor 11. It can be fitted thereafter within the groove 49 in the breaker plate 44 with the severed portions located between two of the apertures 48. The various members can then be reassembled and the extruding operation continue without disrupting the continuity of the conductor 11 or waiting for a particular supply reel 17 to be exhausted.

*Alternative embodiment*

Fig. 5 shows another type of screen pack that may be used instead of the screen pack 50 shown in Fig. 2. In Fig. 5, a breaker plate 144 is supported within a passage 127 similar to the passage 27 of Fig. 2. The breaker plate 144 has a plurality of apertures 148—148 extending therethrough and has a curved, annular groove 149 formed therein. A similarly curved screen pack 150, which includes various screens of fine-mesh is fitted into the groove 149. The central portion of the screen pack 150 is slidable with respect to a core tube holder 137 so that the valve formed by a plug 139 of the core tube holder 137 and a matching frustoconical bore 129 of a die holder 128 can be actuated without disturbing the mounting of the screen pack 150.

The plastic material forming the covering 12 may be solid or expanded polyethylene, or any other suitable thermoplastic material, such as a polyvinyl halide compound. If the covering 12 is composed of expanded polyethylene, polyethylene granules are mixed with an expanding agent which decomposes to produce gas if fed into the hopper 14. The gas resulting from the decomposition of the expanding agent produces minute cells in the extruded polyethylene and there results a cellular insulating covering 12 around the conductor 11.

It will be manifest that this invention is not limited to the specific details described in connection with the above embodiments of the invention. Various modifications may be made within the spirit and scope of the invention.

What is claimed is:

1. Apparatus to extrude plastic material onto a core, which comprises an extruding head having a passage therethrough, a die secured within said passage, a core guide having a portion projecting radially therefrom mounted adjustably longitudinally of said passage and designed to cooperate with said die to control adjustably the amount of extruded material flowing therebetween, an annular breaker plate surrounding said core guide and having portions extending radially inwardly beyond the outer extremity of the radially projecting portion of said core guide to cooperate therewith for removing said breaker plate from said extruding head, and annular screening means surrounding said core guide and abutting said breaker plate to remove foreign matter and oversized particles in said material before said material is extruded onto said core, said core guide being mounted rotatably in the opening of said annular screening means for relative rotational and longitudinal movement therebetween.

2. Plastics extruding apparatus which comprises an extruding head having a passage therethrough, a die secured within said passage, a core guide having a portion projecting radially therefrom mounted longitudinally of said passage and designed to cooperate with said die to control the amount of extruded plastic flowing therebetween, an annular breaker plate having a curved groove therein surrounding said core guide and a portion extending radially inwardly toward the radially projecting portion of said core guide to cooperate therewith for removing said annular breaker plate from said extruding head, and a curved, annular screen surrounding said core guide and abutting said groove in said breaker plate to strain the material before it passes to said die.

3. Plastics extruding apparatus comprising an extrusion cylinder having internal threads therein in which plastic material is placed, a stock screw within the extrusion cylinder to advance the material, an extruding head having external threads thereon designed to engage said threads within the extrusion cylinder to secure said extrusion head to said extrusion cylinder, an extrusion passage formed in the extruding head and having an axis which is transverse to that of the extrusion cylinder, a tapered passageway directing the plastic material from the extrusion cylinder into the extrusion passage, a lock nut extending across and threaded into said passage in the extruding head, said lock nut having a centrally located, threaded aperture therein, an annular backing plate within the passage adjacent to said tapered passageway and having a plurality of apertures therethrough, one of which is centrally located therein, a core tube holder having a frustoconical portion at one end with the base portion forming a radial projecting shoulder adjacent thereto and a threaded portion near the other end thereof adapted to cooperate with the centrally located aperture in said lock nut, said core tube being slidably and rotatably mounted within the centrally located aperture in the breaker plate with the shoulder projecting outwardly beyond the aperture, an annular screen pack positioned adjacent to said breaker plate and slidably and rotatably mounted around said core tube holder, a die holder secured within said passage, a die having an extrusion opening therein mounted within said die holder, and a core tube secured to said core tube holder, said frustoconical portion of said core tube holder being adapted to cooperate with said die holder to control the amount of plastic material extruded therebetween, and the projecting shoulder of said frustoconical portion being adapted to abut with the portion of said breaker plate adjacent to the aperture to remove said screen pack from said passage.

4. Apparatus for extruding plastic material, which comprises an extruding head having a passage therethrough, a die secured within the forward end of the passage, a breaker plate positioned adjacent to said die and having an aperture formed therein, screening means positioned adjacent to said breaker plate and having an aperture formed therein in alignment with the aperture in said breaker plate, a core guide mounted adjustably longitudinally of said passage and extending through the apertures in said breaker plate and screening means and provided with a radially projecting portion which cooperates with the portion of said breaker plate adjacent to the aperture therein for removing said breaker and said screening means from the passage rearwardly as a unit.

References Cited in the file of this patent

UNITED STATES PATENTS

| | | |
|---|---|---|
| 2,185,701 | Boyle | Jan. 2, 1940 |
| 2,205,518 | Duffy | June 25, 1940 |
| 2,257,104 | Burrows et al. | Sept. 30, 1941 |
| 2,308,638 | Balthis et al. | Jan. 19, 1943 |
| 2,341,731 | MacGregor et al. | Feb. 15, 1944 |
| 2,486,474 | Henning | Nov. 1, 1949 |
| 2,581,769 | Olson | Jan. 8, 1952 |
| 2,732,588 | Myers | Jan. 31, 1956 |
| 2,740,158 | Brown | Apr. 3, 1956 |

FOREIGN PATENTS

| | | |
|---|---|---|
| 29,016 | Austria | Jan. 15, 1907 |
| 938,214 | France | Mar. 30, 1948 |